July 10, 1962 G. H. McLAFFERTY 3,043,118
CLOSED CYCLE HEAT ENGINE
Filed June 20, 1960

INVENTOR
GEORGE H. McLAFFERTY
BY Harris G. Luther
ATTORNEY

3,043,118
CLOSED CYCLE HEAT ENGINE
George H. McLafferty, Manchester, Conn., assignor to United Aircraft Corporation, East Hartford, Conn., a corporation of Delaware
Filed June 20, 1960, Ser. No. 37,355
10 Claims. (Cl. 62—402)

This invention relates to heat transfer and power supply means and more particularly to mechanism utilizing the temperature difference between portions of a high speed body subject to aerodynamic heating to provide useful power and still more particularly to mechanism utilizing said temperature difference to cool the leading or hottest portion of a body heated by moving at supersonic velocity through the atmosphere and, if desired, in addition, supplying auxiliary power.

An object of this invention is mechanism which may be completely enclosed within a high speed body to avoid drag, and utilize the difference in temperature of different portions of that body to provide power for circulating fluid to cool the hotter portion and, if desired, supply additional or auxiliary power.

A further object is to provide a light weight mechanism providing cooling for a heated portion of a body having supersonic speed in the atmosphere by utilizing the difference of equilibrium temperatures of different portions of the body.

A further object is a mechanism, useful in an aircraft of the skip glide, or boost glide type, utilizing temperature differences in the aircraft structure to power a closed cycle heat engine of the compressor-turbine type, to provide useful power for circulating cooling fluid to hotter portions of said aircraft, and, if desired, supplying auxiliary power when no power is available from the propulsion system.

Figure 1:
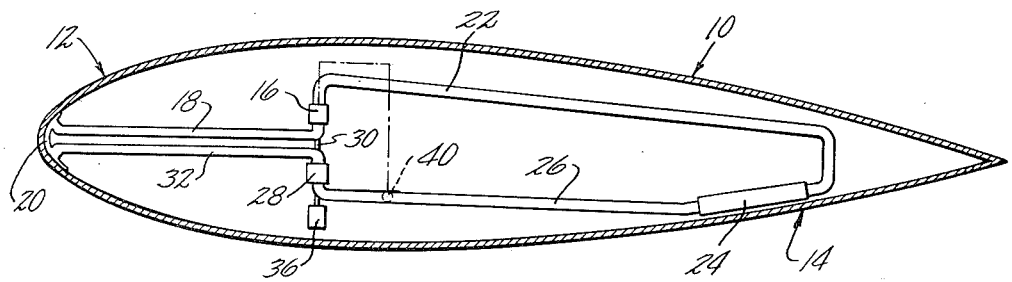

Other objects and advantages will be apparent from the following specification and the accompanying drawing in which FIG. 1 is a schematic cross-section of a wing or body incorporating the present invention.

Figure 2:
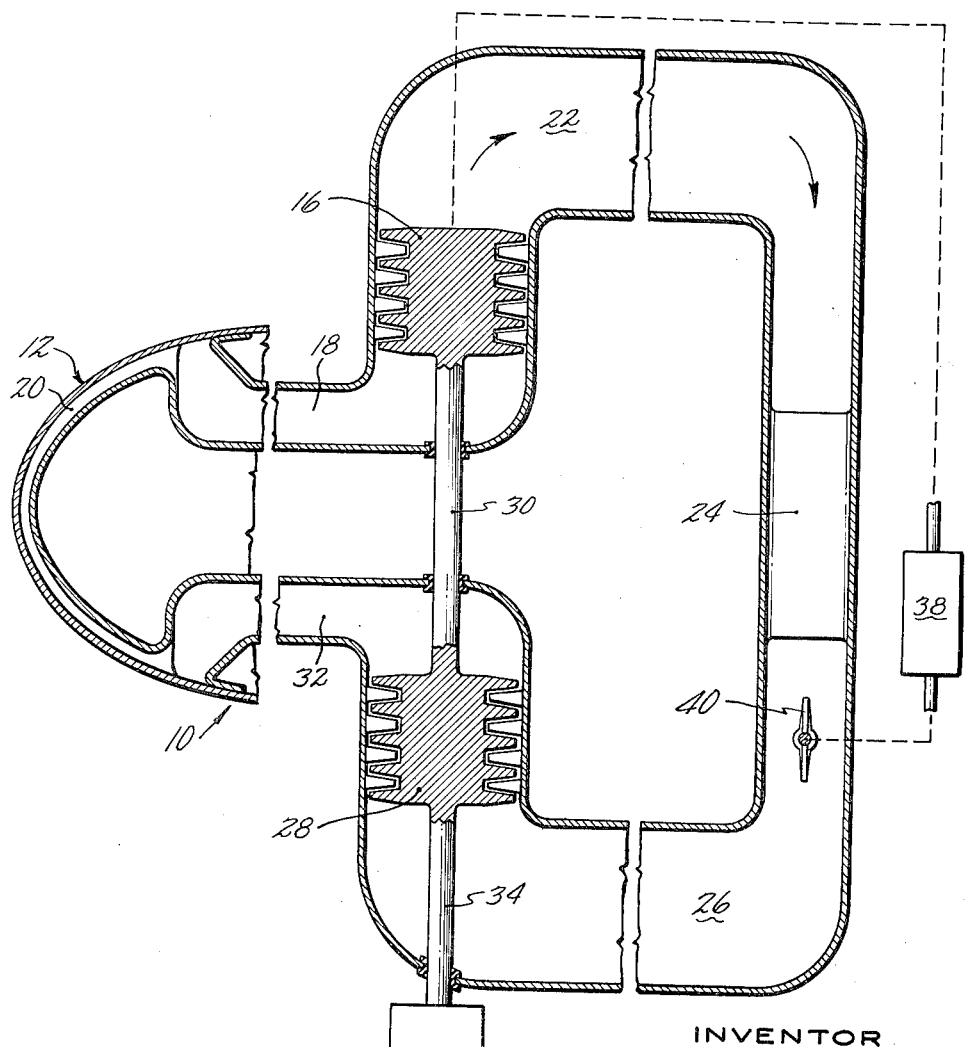

FIG. 2 is a schematic flow diagram of the structure of FIG. 1.

In a body having a supersonic velocity with respect to a surrounding medium such as an aircraft or an aerodynamic body traveling through the atmosphere, it is desirable to cool or remove heat from the leading or hottest portion of such aircraft or aerodynamic body and, particularly in the boost glide or skip glide type of aircraft, it is desirable to provide auxiliary power, especially during the glide period when the main propulsion system is not operating. It is also desirable to provide such cooling or auxiliary power without the penalty of additional drag or additional weight for the necessary fuel. These desirable features may be achieved with my invention, which may be completely enclosed within a wing or aerodynamic body 10, having a leading portion 12 and a trailing portion 14. Although the temperature of each part of the wing or body is raised due to aerodynamic heating, the equilibrium temperature at each station varies from station to station depending on the magnitude of the convective heat transfer coefficient relative to the emissivity of the surface. For instance, the heat transfer coefficient near the leading edge of the wing or body is high relative to the heat transfer coefficient near the downstream end of the wing or body. Therefore the equilibrium temperature is greater near the upstream end than the downstream end of the wing or body. It is proposed to harness the temperature difference between the high equilibrium temperature region near the upstream end of the wing or body and the low equilibrium temperature region near the downstream end of the wing or body to produce power.

A turbine or motor 16 of well known construction receives heated fluid, preferably a gas, which may be of any suitable composition, through a duct 18 from a heat exchanger 20 associated with the leading portion 12 and adapted to transfer heat from the leading portion 12 to the fluid in the heat exchanger 20. The turbine 16 is driven by the fluid passing through the turbine from the duct 18 and is discharged into the duct 22 at a lower pressure and temperature. Duct 22 leads the discharge from the turbine 16 to a radiator or heat rejector 24 associated with the trailing or cooler portion of the aerodynamic body. The fluid in passing through the radiator 24 has its temperature reduced while the pressure remains substantially the same, dropping only the amount necessary to maintain flow.

The discharge from the radiator 24 is led through the duct 26 to the intake of a compressor 28 of well-known construction, which is connected by the shaft 30 with the turbine 16 to be driven thereby. In passing through the compressor 28 the pressure and the temperature of the fluid is raised and then discharged into a duct 32 leading to the heater exchanger 20. In passing from the duct 32 through the heat exchanger 20 to the duct 18, the temperature of the gas is raised as it absorbs heat from the leading portion 12 but the pressure drops only the amount necessary to maintain flow.

The mechanism just described provides a closed cycle heat engine in which the heat is supplied by the heat sink 20 and is absorbed as power in the turbine 16 and rejected to the atmosphere in the heat rejector 24. The power produced in the turbine 16 is utilized to circulate the fluid through the heat rejector 24, and the heat sink 20 and provide a pressure difference for operating the turbine 16. The turbine may be controlled in any desired manner, either manually or automatically, as by a governor, 38, by a control which may be a throttle, 40, or may be by a by-pass around either the turbine or compressor. By designing the turbine to provide a substantial temperature drop in the turbine, it is possible to use the temperature difference between the two selected portions of the aerodynamic body to produce auxiliary power. This may be accomplished by driving a shaft 34 shown connected to the compressor 28 and driving auxiliary mechanism such as a generator or a pump 36 for supplying the auxiliary power.

From the above description, it will be appreciated that I have provided a closed cycle heat engine requiring no fuel, as such, which may be completely enclosed without any external connections in an aerodynamic body or wing, and will provide cooling for a portion of the body operating at an elevated temperature due to aerodynamic heating and heating for a portion of the body operating at a lower equilibrium temperature, and, in addition, provide auxiliary power, if desired.

It is to be understood that the invention is not limited to the specific embodiment herein illustrated, and described, but may be used in other ways without departure from its spirit and that various changes can be made which would come within the scope of the invention which is limited only by the appended claims.

I claim:

1. In an aircraft structure subject to heating due to movement through the atmosphere at supersonic speeds and having a leading portion with a high equilibrium temperature and a trailing portion, with a lower equilibrium temperature, a closed cycle heat engine comprising a heat sink associated in heat transferring relation with said leading portion and a heat rejector associated in heat transferring relation with said trailing portion, to extract heat from said leading portion and supply heat to said trailing portion respectively, means forcing fluid from said heat rejector through said heat sink and power means extracting heat from said fluid discharge from said heat sink and discharging said fluid to said heat rejector.

2. In an aircraft structure having a leading portion subject to heating and a high equilibrium temperature due to movement through the atmosphere at supersonic speeds and having a trailing portion having a lower equilibrium temperature, a first heat exchanger associated in heat transferring relation with said leading portion and a second heat exchanger associated in heat transferring relation with said trailing portion, an engine, and means forming a closed cycle with said engine and both of said heat exchangers for circulating fluid through said exchangers in series for cooling said leading portion, heating said trailing portion, and supplying heat for operating said engine to supply power.

3. In a structure having a first portion subject to an elevated equilibrium temperature due to movement at supersonic speed through the atmosphere and a second portion subject to a lower equilibrium temperature, said first portion including a heat sink for extracting heat from said first portion, said second portion including a heat rejector for supplying heat to said second portion, an engine, a closed cycle system including means for circulating fluid through said heat sink, said engine, and said heat rejector in series, to supply fluid to said heat sink cooler than said first portion, heated fluid to said engine, and fluid to said heat rejector warmer than said second portion.

4. A structure as claimed in claim 3 in which said circulating means is driven by said engine and pumps fluid from said rejector to said sink.

5. In combination with mechanism subject to passage through the atmosphere at supersonic speeds, means for supplying auxiliary power, comprising a first heat exchanger absorbing heat from a portion of said mechanism subject to an elevated equilibrium temperature due to heating by the atmosphere, a turbine, a compressor driven by said turbine, a second heat exchanger rejecting heat to a portion of said mechanism having a lower equilibrium temperature, and means connecting said first heat exchanger with said turbine, said turbine with said second heat exchanger, said second heat exchanger wtih said compressor, and said compressor with said first heat exchanger to provide a closed cycle heat exchange and power producing system.

6. In combination with an aircraft subject to gliding through the atmosphere at supersonic speeds without power, a heat engine comprising a first heat exchanger for absorbing heat from a first portion of said aircraft subject to an elevated equilibrium temperature due to said gliding, a motor, a second heat exchanger for rejecting heat to a second portion of said aircraft subject to a lower equilibrium temperature, and means driven by said motor for circulating fluid, said first heat exchanger, said motor, said second heat exchanger and said circulating means being connected in series to provide a closed fluid circulating system in which the motor provides the power for driving the circulating means and the fluid in the first heat exchanger cools said first portion.

7. A combination as claimed in claim 6 including auxiliary power absorbing means driven by said motor.

8. A combination as claimed in claim 6 in which said entire system is entirely submerged in said aircraft and is mechanically isolated from the aircraft exterior surface and the heat exchangers are thermally connected with said exterior surface.

9. In combination with an object having one portion heated to a higher temperature than another portion by friction due to rapid travel of the object through the atmosphere comprising, a heat exchanger at each portion in heat exchange relation with said object, means circulating a fluid in a closed cycle through said heat exchangers, and means located in the fluid stream between said exchangers absorbing energy from said stream in its pasage from the exchanger at the higher temperature to the heat exchanger at the lower temperature, and transforming said energy into power to drive said circulating means.

10. In combination with mechanism subject to passage through the atmosphere at speeds causing heating of said mechanism, a first heat exchanger absorbing heat from a portion of said mechanism subject to an elevated equilibrium temperature due to heating of said portion by the atmosphere, a turbine, a compressor driven by said turbine, a second heat exchanger rejecting heat to a portion of said mechanism having a lower equilibrium temperature, and means connecting the outlet of said first heat exchanger with the inlet of said turbine, said turbine outlet with the inlet of said second heat exchanger, said second heat exchanger outlet with the inlet of said compressor, and said compressor outlet with the inlet of said first heat exchanger, to provide a closed cycle heat exchanger and power producing system.

References Cited in the file of this patent
UNITED STATES PATENTS

| | | |
|---|---|---|
| 1,871,244 | Steuart | Aug. 9, 1932 |
| 2,353,966 | Newcombe | July 18, 1944 |
| 2,486,034 | Katzow | Oct. 25, 1949 |
| 2,820,348 | Sauter | Jan. 21, 1958 |